July 4, 1967     H. HOGNESTAD     3,329,018
DEVICE FOR ELECTRO-MAGNETIC FLOW MEASUREMENT
Filed June 10, 1964
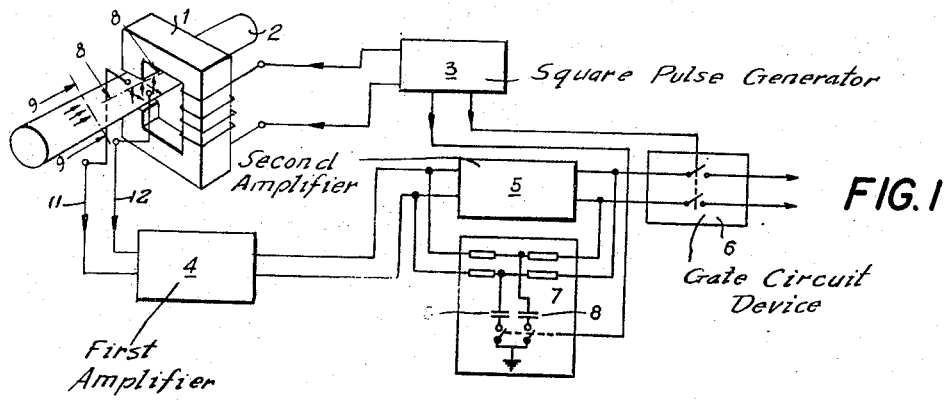
FIG.1
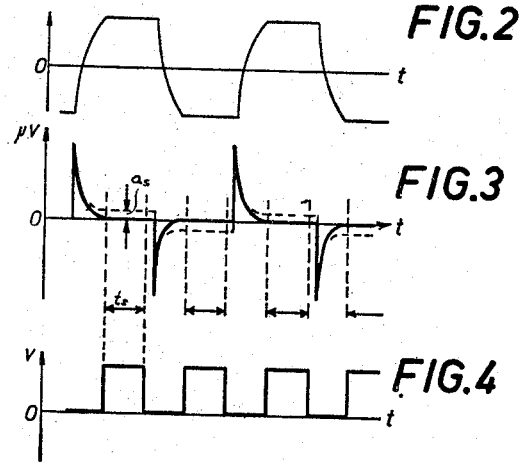
FIG.2
FIG.3
FIG.4
FIG.5
FIG.6
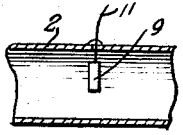
FIG.9
FIG.8
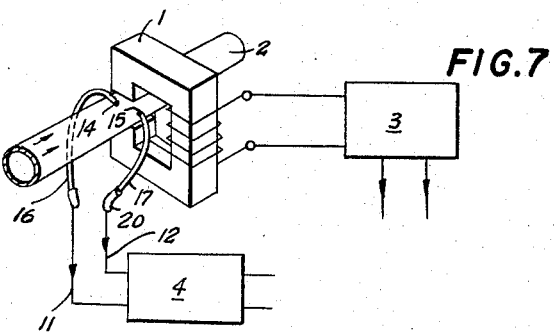
FIG.7
INVENTOR
HÅREK HOGNESTAD
ATTORNEY

United States Patent Office 3,329,018
Patented July 4, 1967

3,329,018
DEVICE FOR ELECTRO-MAGNETIC FLOW MEASUREMENT
Hårek Hognestad, Oslo, Norway, assignor to Nyegaard & Co. A/S, Oslo, Norway
Filed June 10, 1964, Ser. No. 374,137
4 Claims. (Cl. 73—194)

This invention refers to a device for electromagnetic flow measurment of the type which works on a square pulse shaped or sine shaped magnetic field, and two electrodes, one opposite the other, at right angles to the direction of flow and the magnetic field where the voltage induced as a result of the liquid flowing between the electrodes, after amplification is fed to a gate circuit device which is controlled by the magnetic pulses and which passes only a required part of the measured voltage.

The results of measurements made with flow meters of this type are not fully reliable, and this lack of reliability is mainly due to two sources, namely transformer effect on the electrodes and their leads, and electrode polarization. With regard to the first source of error, the above mentionad gate circuit device has admittedly been introduced enabling only a desired part of the measured voltage to be extracted, but in practice this precaution has proved insufficient.

The purpose of this invention therefore is to introduce a method of electro-magnetic flow measurement in which error in results measured due to the two above mentioned sources is made acceptably small.

This is achieved, according to the invention, by the amplifier used for the above-mentioned amplification being a D.C. amplifier with negative feedback which, in synchronization with the magnetic field pulses, is capacitively shunted in such a way that the feedback is cancelled for a desired part of the measured voltage. Specifiically, the low frequencies and the D.C. component are fed back all the time, and are thus cancelled, whereas the high frequencies are grounded through condensers for the desired period so that such high frequencies are not fed back and are amplified. The term "low frequencies" means frequencies which are below the frequency of the magnetic field. By "high frequencies" is meant frequencies the same as and above the frequency of the magnetic field, that is, the generator frequency. Firstly, in this way, condensers are avoided in the amplification path; condensers here could introduce transient distortion, but on the other hand the D.C. amplifier could easily be over loaded by a more or less constant direct voltage which will always be present across the electrodes. This voltage is due to electro-chemical potential difference arising because the electrodes can never be made quite identical. Because of this, the amplification of low frequencies is reduced with the help of negative feedback. However, to prevent the negative fedback affecting the desired part of the measured voltage, the negative fedback is shunted capacitively for the required part of the signal, and this shunting is achieved with the help of an electronic switch controlled synchronously with the magnetic field pulses.

The polarization of the electrodes is mainly due to eddy currents in the liquid as a result of the magnetic field, passing through the electrodes. This can, according to the invention, be prevented in three ways. Firstly, the electrodes can be made of a material which has a specific resistance so high in relationship to the specific resistance of the liquid, that eddy currents in the liquid are largely prevented from passing the electrodes. Secondly, the electrodes may be arranged outside the magnetic field, the electrical connection between the electrodes and the liquid being achieved through channels full of such liquid. This embodiment is shown in FIG. 7, to be described.

Thirdly, the electrodes may be made with a rectangular cross section, with the short side in line with the direction of the eddy currents arising in the liquid as a result of the magnetic field.

A device for electro-magnetic flow measurement, according to the invention, will be explained below in more detail with reference to the drawings.

FIGURE 1 is a circuit diagram for the most important parts of the flow meter.

FIGURES 2–6 show various curves to explain what happens in the device.

FIG. 7 is a fragmentary view of a second embodiment of flow meter in accordance with the invention.

FIG. 8 is a fragmentary view in longitudinal section through the apparatus of FIG. 1, the section being taken along the line 8—8 of FIG. 1.

FIG. 9 is a view in transverse section taken along the line 9—9 of FIG. 1.

FIGURE 1 represents a measuring head 1 with a magnetic core, gap and magnetizing winding which is fed with square pulses from a generator 3. In the gap, at right angles to the magnetic field, there is a non-magnetic tube 2 through which the liquid to be measured flows. Two electrodes 9 and 10, one opposite the other, arranged at right angles to the direction of flow and the magnetic field, are connected through wires 11 and 12, respectively, to the input socket of an amplifier 4, which is followed by a further amplifier 5 whose output terminals are connected to a gate circuit device 6, which is controlled by the pulse generator 3, and which only passes a required part of the measured voltage. Between the input terminals and the output terminals of the amplifier 5 there is a negative feedback path with a filter 7 where the negative feedback path is shunted by means of two condensers 8, which are connected to earth by means of electronic switches controlled by the pulse generator 3. The condensers 8 ground the high frequencies for the desired period, so that such high frequencies are not fed back and are amplified.

The electronic switches in the negative feedback path operate in synchronism with the switches in the gate circuit 6. All of such switches, that is, those in the gate 6 and those in the negative feedback path, are thus closed during the time interval $t_s$. The signal from the electrodes may thus pass with full amplification through the second amplifier 5 and thence through the gate circuit device 6.

FIGURE 2 represents the square pulse shape of the magnetic field.

FIGURE 3 shows the unwanted part of the signal which is due to transformer effect on the electrodes and their leads (full line). $a_s$ shows the amplitude of the wanter part of the signal, and $t_s$ shows the time the gate circuit device 6 is open for passing the desired part of the signal.

FIGURE 4 shows the control pulses for the gate circuit device 6 which are taken from the pulse generator 3 via a delay stage.

FIGURE 5 shows the required part of the signal after the gate circuit device 6.

FIGURE 6 shows the deformation of the curve (full line) on FIGURE 3, an account of the polarization of the electrodes as it appears after the amplifier 4.

FIGURE 6 shows the signal which can be measured at the electrodes when the transformer pulses are balanced to zero; in other words that component which is due to electrode polarization and which is normally added to the full line in FIGURE 3. From FIGURE 6 we see that the last part of each discharge pulse just overlaps the sampling interval. By using a device in accordance with the invention, this overlapping can be significantly reduced, or completely eliminated.

In FIG. 7 there is fragmentarily shown a second embodiment of flow meter in accordance with the invention. The measuring head, the non-magnetic tube, the pulse generator, and the first amplifier, which are there shown, are the same as those shown in FIG. 1, and are designated by the same reference characters. The remainder of the second embodiment of the system beyond the generator 3 and the first amplifier 4 is the same as in FIG. 1 and thus is not reproduced in FIG. 7.

The system of FIG. 7 differs from that of FIG. 1 in that the electrodes are disposed outside the magnetic field, the electrical connection between the electrodes and the liquid being achieved through channels full of such liquid. In FIG. 7 electrically non-conductive tubes 16 and 17, functioning as such channels, are connected to tube 2, to receive liquid therefrom, at opposed zones 14 and 15, respectively. Conductive metal stoppers 19 and 20, at the outer ends of tubes 16 and 17, which are connected to lead wires 11 and 12, respectively, make electrical connection between the liquid in the tube and its lead wire. As shown, the zones 14 and 15 of connection of tubes 16 and 17 to tube 2 are located outside the magnetic field of the measuring head 1.

I claim:

1. A device for electro-magnetic liquid flow measurement of the type which works on a square pulse shaped or sine shaped magnetic field generated by an electromagnet supplied from a local generator, said device having two electrodes arranged one opposite the other at right angles to the direction of flow and the magnetic field, a D.C. amplifier for amplifying the voltage induced between the electrodes as a result of the flow of the liquid, a gate circuit, means connecting the output of the amplifier to the gate circuit, the gate circuit being controlled by pulses which are synchronized with the magnetic field so that the signal introduced to the amplifier is passed by the gate circuit during predetermined intervals when the magnetic field is constant, the amplifier having a negative feedback circuit which reduces the amplification of the signals introduced to the amplifier, said feedback circuit having condensers, and switches operated in the same way as the gate circuit for connecting the condensers in and disconnecting them from the feedback circuit, so that the negative feedback of the frequency of the magnetic field is eliminated when the magnetic field is constant.

2. A device in accordance with claim 1, wherein the electrodes consist of a material having a specific resistance which is so high compared to the specific resistance of the liquid, that eddy currents in the liquid are, to a significant degree, prevented from passing the electrodes and the electrode surfaces are not polarized by eddy current.

3. A device in accordance with claim 1, wherein the electrodes are arranged outside the magnetic field, and connected to the liquid by channels filled by a liquid, so that eddy current introduced in the liquid flow can not polarize the electrodes.

4. A device in accordance with claim 1, wherein the electrodes have a rectangular cross section with the short side being in line with the direction of the eddy currents arising in the liquid flow as a result of the magnetic field, so that polarization of the electrodes by the eddy currents is reduced.

References Cited

UNITED STATES PATENTS

| | | | |
|---|---|---|---|
| 2,149,847 | 3/1939 | Kolin | 73—194 |
| 2,808,723 | 10/1957 | Buntenbach | 73—194 |

OTHER REFERENCES

An article entitled, "The Square Wave Electromagnetic Flowmeter," by Spencer et al., from IRE Transactions on Medical Electronics, pp. 220–228, p. 221, December 1959.

JAMES J. GILL, *Acting Primary Examiner.*